(12) United States Patent
Nagai et al.

(10) Patent No.: US 9,624,970 B2
(45) Date of Patent: Apr. 18, 2017

(54) TAPERED ROLLER BEARING

(71) Applicant: JTEKT CORPORATION, Osaka-shi, Osaka (JP)

(72) Inventors: Atsushi Nagai, Kashiwara (JP); Akiyuki Suzuki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/074,508

(22) Filed: Mar. 18, 2016

(65) Prior Publication Data

US 2016/0281773 A1 Sep. 29, 2016

(30) Foreign Application Priority Data

Mar. 23, 2015 (JP) .................. 2015-059580

(51) Int. Cl.

| | | |
|---|---|---|
| *F16C 19/34* | (2006.01) | |
| *F16C 19/36* | (2006.01) | |
| *F16C 33/66* | (2006.01) | |
| *F16C 43/04* | (2006.01) | |
| *F16H 57/04* | (2010.01) | |
| *F16C 19/54* | (2006.01) | |
| *F16C 33/58* | (2006.01) | |

(52) U.S. Cl.
CPC ........ *F16C 19/364* (2013.01); *F16C 33/6651* (2013.01); *F16C 43/04* (2013.01); *F16H 57/0471* (2013.01); *F16C 19/548* (2013.01); *F16C 33/583* (2013.01); *F16C 33/6681* (2013.01); *F16C 2226/74* (2013.01); *F16C 2361/61* (2013.01)

(58) Field of Classification Search
CPC F16C 33/6655; F16C 33/6651; F16C 33/664; F16C 33/66; F16C 19/364
See application file for complete search history.

(56) References Cited

U.S. PATENT DOCUMENTS 2,098,683 A * 11/1937 Wise ............... F16C 25/08
384/475
7,645,074 B2 * 1/2010 Chiba ............... F16C 19/364
384/571

(Continued)

FOREIGN PATENT DOCUMENTS

| JP | S55-61621 U | 4/1980 |
|---|---|---|
| JP | 2008-057791 A | 3/2008 |
| JP | 2008-232255 A | 10/2008 |

*Primary Examiner* — Thomas R. Hannon
(74) *Attorney, Agent, or Firm* — Oliff PLC

(57) ABSTRACT

A tapered roller bearing includes an outer ring having an outer-ring raceway surface that increases in diameter from a first side toward a second side in an axial direction, an inner ring having an inner-ring raceway surface and having a cone large face rib that is located on the second side of the inner ring in the axial direction, a plurality of tapered rollers, an annular cage, and a holding member provided on the second side of the outer ring in the axial direction to enable a lubricant inside the bearing to be held. The holding member has a cylindrical portion provided adjacently to the outer ring and a protruding portion protruding inward from the cylindrical portion in the radial direction. A slit is formed in the cylindrical portion to separate a radially inner portion, on which the protruding portion is provided, from a radially outer portion.

4 Claims, 11 Drawing Sheets

(56) References Cited

U.S. PATENT DOCUMENTS

| | | | |
|---|---|---|---|
| 2008/0096715 A1* | 4/2008 | Ono | F16C 19/548 |
| | | | 475/160 |
| 2008/0219606 A1 | 9/2008 | Sada et al. | |
| 2009/0208152 A1* | 8/2009 | Masuda | F16C 19/364 |
| | | | 384/100 |
| 2015/0247532 A1* | 9/2015 | Suzuki | F16C 33/6674 |
| | | | 384/462 |

* cited by examiner

PRIOR ART

PRIOR ART

TAPERED ROLLER BEARING

INCORPORATION BY REFERENCE

The disclosure of Japanese Patent Application No. 2015-059580 filed on Mar. 23, 2015 including the specification, drawings and abstract, is incorporated herein by reference in its entirety.

BACKGROUND OF THE INVENTION

1. Field of the Invention

The invention relates to a tapered roller bearing.

2. Description of the Related Art

Tapered roller bearings can receive a radial load and an axial load in one direction and are used in various fields. For example, a tapered roller bearing is used to support a shaft provided in a gear mechanism for a transmission, a differential apparatus, and the like in an automobile. Such a tapered roller bearing includes an outer ring, an inner ring, a plurality of tapered rollers, and an annular cage. The outer ring has an outer-ring raceway surface that increases in diameter from a first side toward a second side in an axial direction. The inner ring has an inner-ring raceway surface facing the outer-ring raceway surface and has a cone back face rib (large rib) on the second side of the inner-ring raceway surface in the axial direction. The tapered rollers are interposed between the outer-ring raceway surface and the inner-ring raceway surface. The cage holds the tapered rollers spaced at intervals in a circumferential direction.

For example, in the differential apparatus, a bottom portion of a housing of the apparatus serves as a lubricant reservoir (oil reservoir). A rotating ring gear scoops up and splatters a lubricant stored in the lubricant reservoir to allow the lubricant to be used to lubricate the tapered roller bearing. However, in an initial stage of rotation such as starting of an engine, feeding of oil to the tapered roller bearing based on the scraping of the lubricant as described above is insufficient, possibly bringing the tapered roller bearing into a poor lubrication state. In the tapered roller bearing, large end faces of the tapered rollers come into sliding contact with the large rib of the inner ring. Consequently, when these sliding contact portions are in the poor lubrication state, temperature may be elevated due to sliding friction, leading to seizure.

Thus, a tapered roller bearing has been proposed in which a ring member (partition plate) with an L-shaped section is attached to a part of the outer ring that corresponds to an outer position of the large rib of the inner ring in a radial direction, that is, to an end of the outer ring (see FIG. 5 and FIG. 6 in Japanese Patent Application Publication No. 2008-57791 (JP 2008-57791 A)). The ring member allows the lubricant to be stored in the tapered roller bearing. Consequently, in the initial stage of rotation, the lubricant can be utilized for lubrication between the large rib of the inner ring and end surfaces of the tapered roller bearings.

The ring member with an L-shaped section described in JP 2008-57791 A is obtained by fixing an elastic member to an annular core. The configuration described in JP 2008-57791 A has, for example, the disadvantage of having difficulty in reducing component costs, and thus, the inventors have proposed a tapered roller bearing with a new configuration as described below (Japanese Patent Application No. 2014-040356). That is, as depicted in FIG. 11, the tapered roller bearing includes an annular holding member 91 provided adjacently to an outer ring 90 to enable a lubricant inside the bearing to be held. The holding member 91 has a cylindrical portion 92 and a protruding portion 93. The protruding portion 93 protrudes inward from the cylindrical portion 92 in the radial direction. The cylindrical portion 92 and the protruding portion 93 are integrally formed.

The tapered roller bearing may be assembled as follows. First, as depicted in FIG. 12, an inner ring 99, a cage 98, and tapered rollers 97 are assembled together into an inner ring unit 96. As depicted in FIG. 13, the inner ring unit 96 is moved closer, in an axial direction, to the outer ring 90 and the holding member 91 previously attached to a housing 95, to complete the assembly.

However, as depicted above, the holding member 91 is provided adjacently to the outer ring 90. The holding member 91 has the protruding portion 93 protruding inward from the cylindrical portion 92 in the radial direction. Thus, when the inner ring unit 96 is moved closer to the holding member 91 and the outer ring 90 in the axial direction, radial outermost portions 97a of the tapered rollers 97 in the inner ring unit 96 interfere with the protruding portion 93. The protruding portion 93 is elastically deformable. Consequently, the radial outermost portions 97a of the tapered rollers 97 elastically deform and climb over the protruding portion 93, enabling assembly of the tapered roller bearing. However, the holding member 91 (protruding portion 93) may be damaged. Accordingly, an operation of assembling the tapered roller bearing needs to be carefully performed and is thus difficult.

SUMMARY OF THE INVENTION

An object of the invention is to provide a tapered roller bearing with a new configuration (holding member) and that can be easily assembled.

An aspect of the invention provides a tapered roller bearing including an outer ring having an outer-ring raceway surface that increases in diameter from a first side toward a second side of the outer ring in an axial direction, an inner ring having an inner-ring raceway surface facing the outer-ring raceway surface and having a cone back face rib that is located on the second side of the inner ring in the axial direction and that protrudes outward in a radial direction, a plurality of tapered rollers interposed between the outer-ring raceway surface and the inner-ring raceway surface, an annular cage that holds the tapered rollers spaced at intervals in a circumferential direction, and a holding member provided on the second side of the outer ring in the axial direction to enable a lubricant inside the bearing to be held. The holding member has a cylindrical portion provided adjacently to the outer ring and a protruding portion protruding inward from the cylindrical portion in the radial direction. A slit is formed in the cylindrical portion to separate a radially inner portion, on which the protruding portion is provided, from a radially outer portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
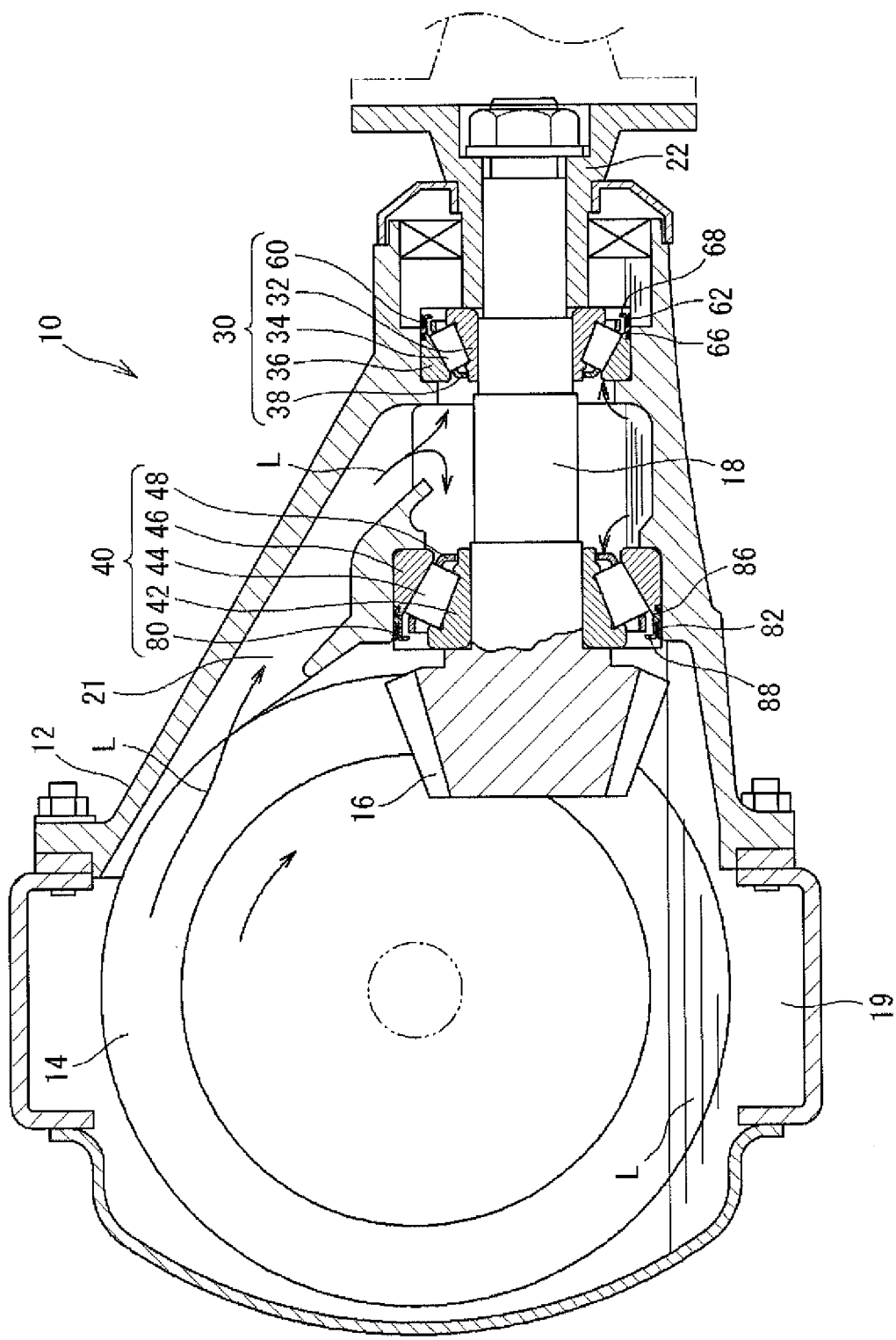
FIG. 1 is a longitudinal sectional view depicting an embodiment of a rotating apparatus including a tapered roller bearing according to the invention.

Embodiments of the invention will be described below based on the drawings. FIG. 1 is a longitudinal sectional view depicting an embodiment of a rotating apparatus including a tapered roller bearing according to the invention. In a description of the present embodiment, the tapered roller bearing is applied to a differential apparatus 10 in an automobile. However, the tapered roller bearing can be applied to various rotating apparatuses.

In the differential apparatus 10, a ring gear 14 and a drive pinion 16 are arranged in a housing 12 so as to mesh with each other. The drive pinion 16 is integrally formed at a first end (in FIG. 1, a left end) of a shaft 18. A sleeve 22 is attached to a second end (in FIG. 1, a right end) of the shaft 18. The sleeve 22 is coupled to an engine via a joint and a propeller shaft not depicted in the drawings. A driving force of the engine is transmitted to the drive pinion 16. The ring gear 14 is equipped with a differential mechanism not depicted in the drawings. The differential mechanism transmits mechanical power to right and left wheels.

The shaft 18 is rotatably supported in the housing 12 by a front bearing 30 and a rear bearing 40. The front bearing 30 and the rear bearing 40 are both tapered roller bearings. The front bearing 30 and the rear bearing 40 are different in bearing number (in size) but have the same configuration. Thus, a detailed configuration of the tapered roller bearing according to the invention will be described taking the front bearing 30 as an example.

Figure 2:
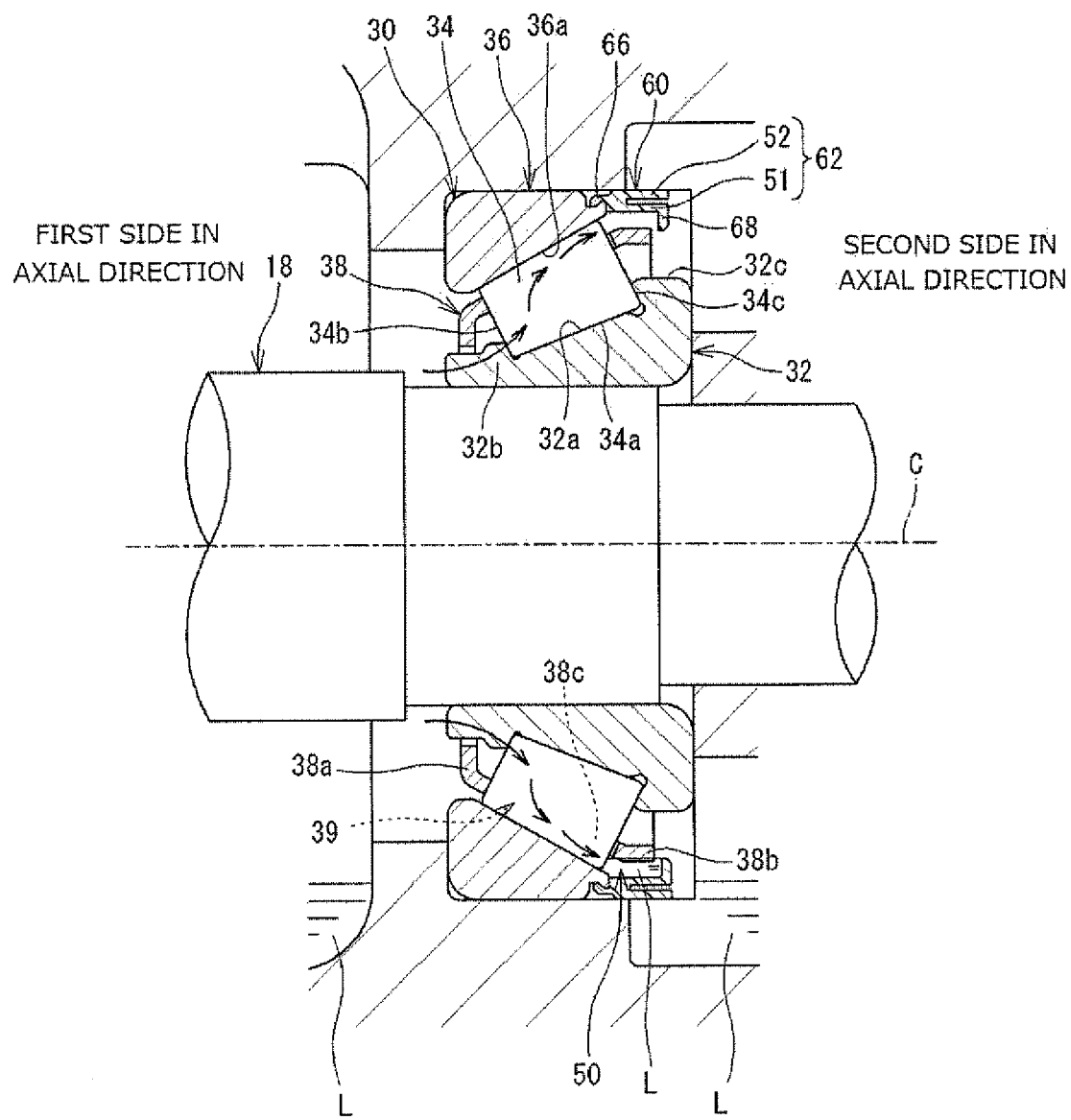
FIG. 2 is a longitudinal sectional view depicting a front bearing and a periphery thereof.

FIG. 2 is a longitudinal sectional view of the front bearing 30 and a periphery thereof. The front bearing 30 includes an outer ring 36, an inner ring 32, tapered rollers 34, a cage 38, and a holding member 60. The outer ring 36 has an outer-ring raceway surface 36a shaped like a conical surface and increasing in diameter from a first side (in FIG. 2, a left side) toward a second side (in FIG. 2, a right side) in the axial direction. The inner ring 32 has an inner-ring raceway surface 32a shaped like a conical surface and facing the outer-ring raceway surface 36a. The inner ring 32 has a cone front face rib (small rib) 32b with a small diameter and a large rib 32c with a large diameter. The small rib 32b is located on the first side of the inner-ring raceway surface 32a in the axial direction and protrudes outward in a radial direction. The large rib 32c is located on the second side of the inner-ring raceway surface 32a in the axial direction and protrudes outward in the radial direction.

Each of the tapered rollers 34 has an outer peripheral surface 34a shaped like a truncated cone. The tapered roller 34 has a small end face 34b on the first side of the tapered roller 34 in the axial direction and a large end face 34c on the second side of the tapered roller 34 in the axial direction. A plurality of the tapered rollers 34 is interposed between the outer-ring raceway surface 36a and the inner-ring raceway surface 32a. The inner ring 32 rotates to roll the tapered rollers 34 on the inner-ring raceway surface 32a and the outer-ring raceway surface 36a.

The cage 38 is an annular member having a small-diameter annular portion 38a on the first side of the cage 38 in the axial direction, a large-diameter annular portion 38b on the second side of the cage 38 in the axial direction, and a plurality of cage bars 38c. The cage bars 38c connect the annular portions 38a and 38b together. Pockets 39 in which the tapered rollers 34 are housed correspond to spaces formed between the annular portions 38a and 38b and each between the adjacent cage bars 38c in a circumferential direction. Thus, the cage 38 can hold the tapered rollers 34 such that the tapered rollers 34 are spaced at intervals in the circumferential direction.

Figure 10:
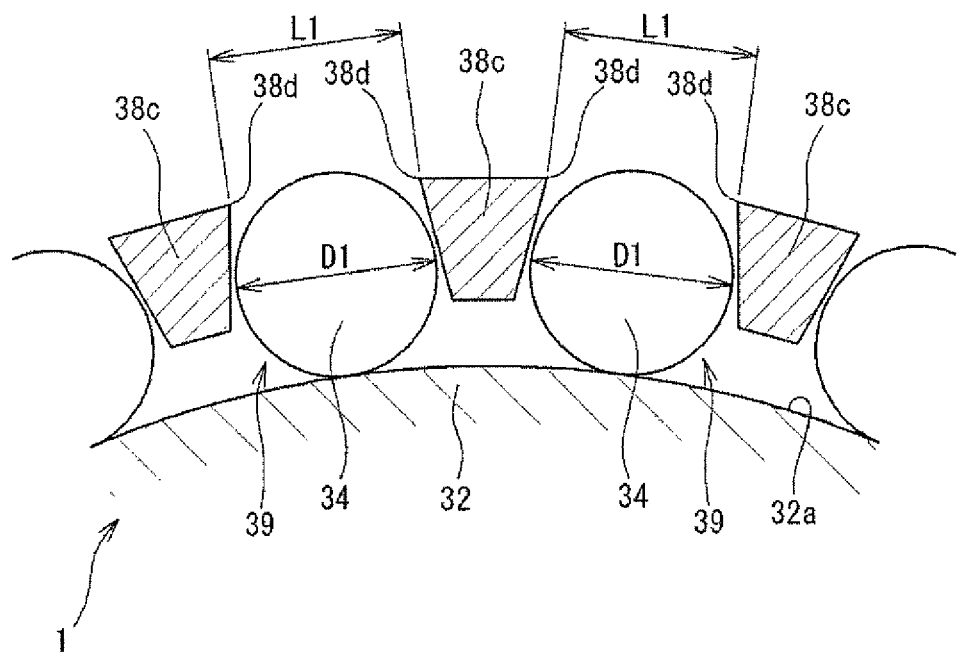
FIG. 10 is a sectional view of an interior of a bearing as seen in a direction parallel to roller centerlines.
Figure 11:
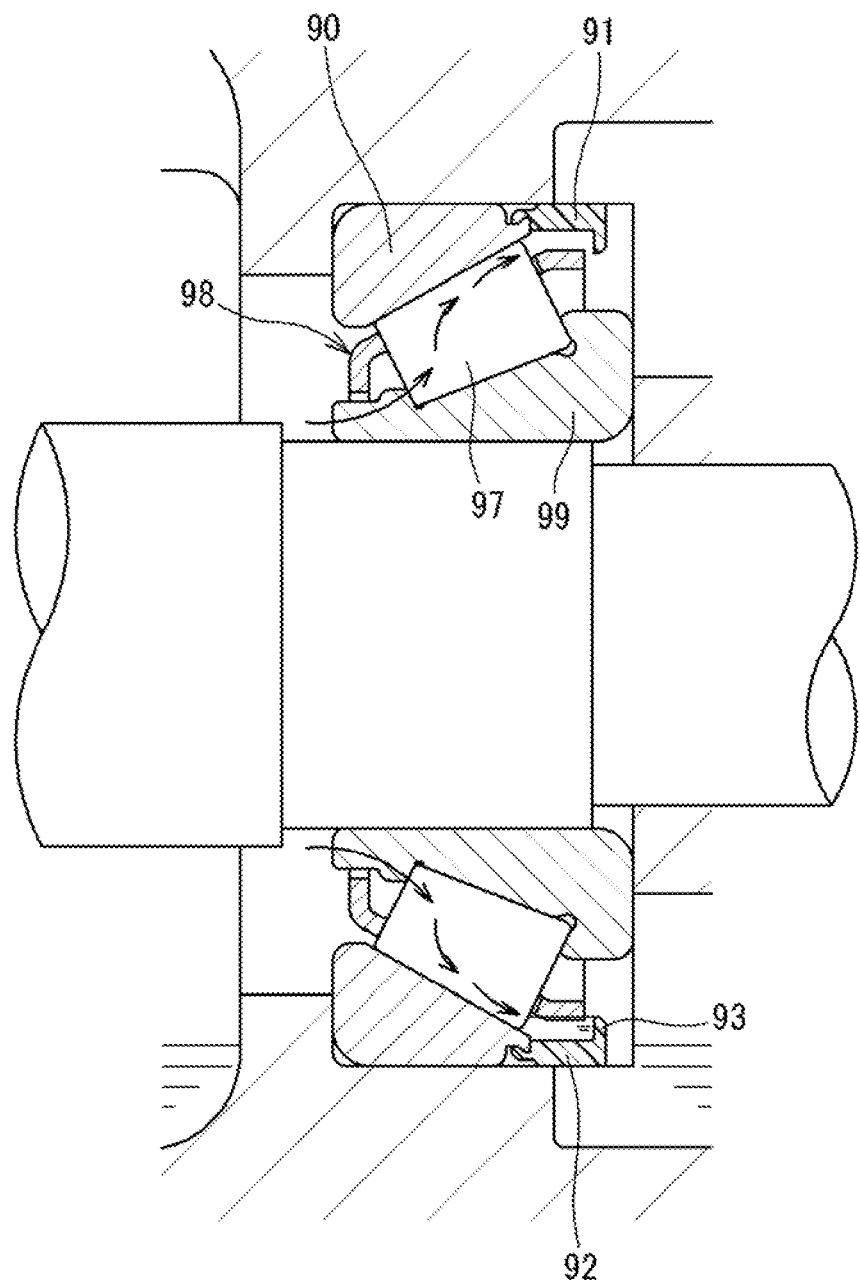
FIG. 11 is a longitudinal sectional view of a tapered roller bearing (referential invention)
Figure 12:
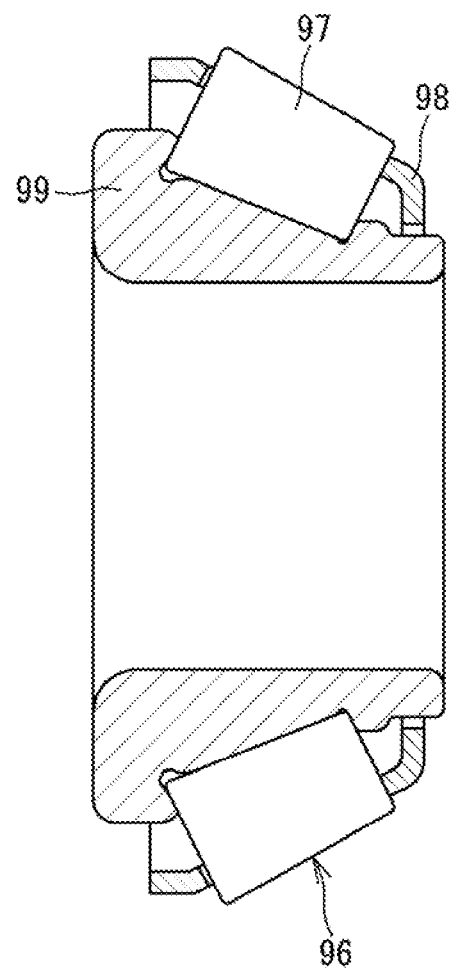
FIG. 12 is a diagram illustrating assembly of the tapered roller bearing in FIG. 11.
Figure 13:
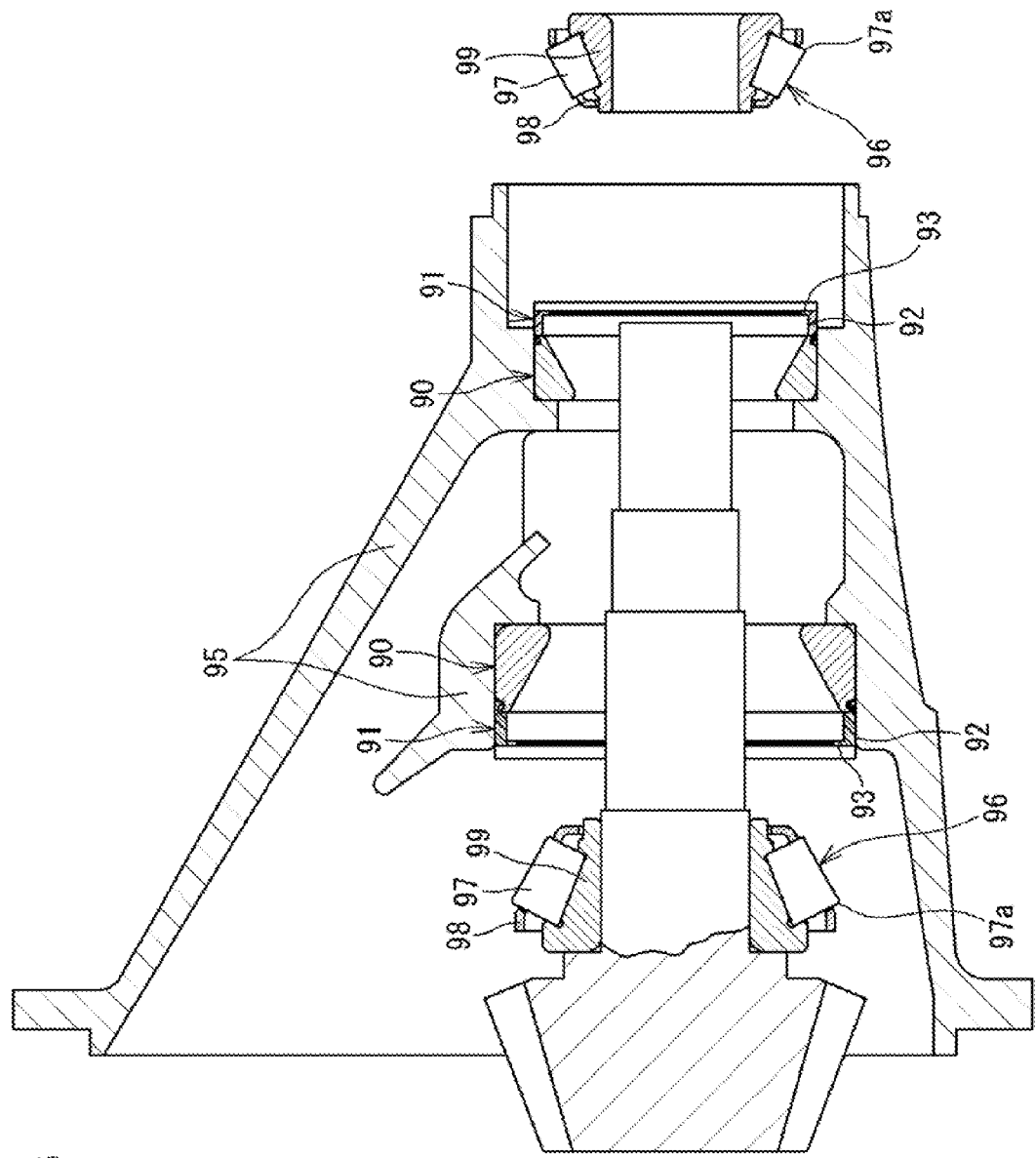
FIG. 13 is a diagram illustrating assembly of the tapered roller bearing in FIG. 11.

The cage 38 has roller retaining portions that inhibit the tapered rollers 34 housed in the pockets 39 from falling outward in the radial direction (when the bearing is assembled). Each of the roller retaining portions in the present embodiment is an outer portion of the cage bar 38c (see FIG. 10). As depicted in FIG. 10, in a cross sectional view orthogonal to centerlines of the tapered rollers 34, a circumferential dimension L 1 between a pair of roller retaining portions 38d and 38d positioned on the opposite sides of one pocket 39 in the circumferential direction is smaller than a diameter D1 of each of the tapered rollers 34 in the cross section (L1<D1). Thus, when being displaced outward in the radial direction, the tapered roller 34 in each of the pockets 39 comes into contact with the roller retaining portions 38d and 38d and is inhibited from falling outward in the radial direction.

In FIG. 2, the holding member 60 is a member configured to hold a lubricant L flowing through the front bearing 30. In other words, the holding member 60 is a member that forms a reservoir portion 50 for the lubricant L in the front bearing 30. To form the reservoir portion 50, the holding member 60 has a cylindrical portion 62 and an annular protruding portion 68. The cylindrical portion 62 is provided adjacently to the outer ring 36. The protruding portion 68 protrudes inward from the cylindrical portion 62 in the radial direction.

Figure 3:
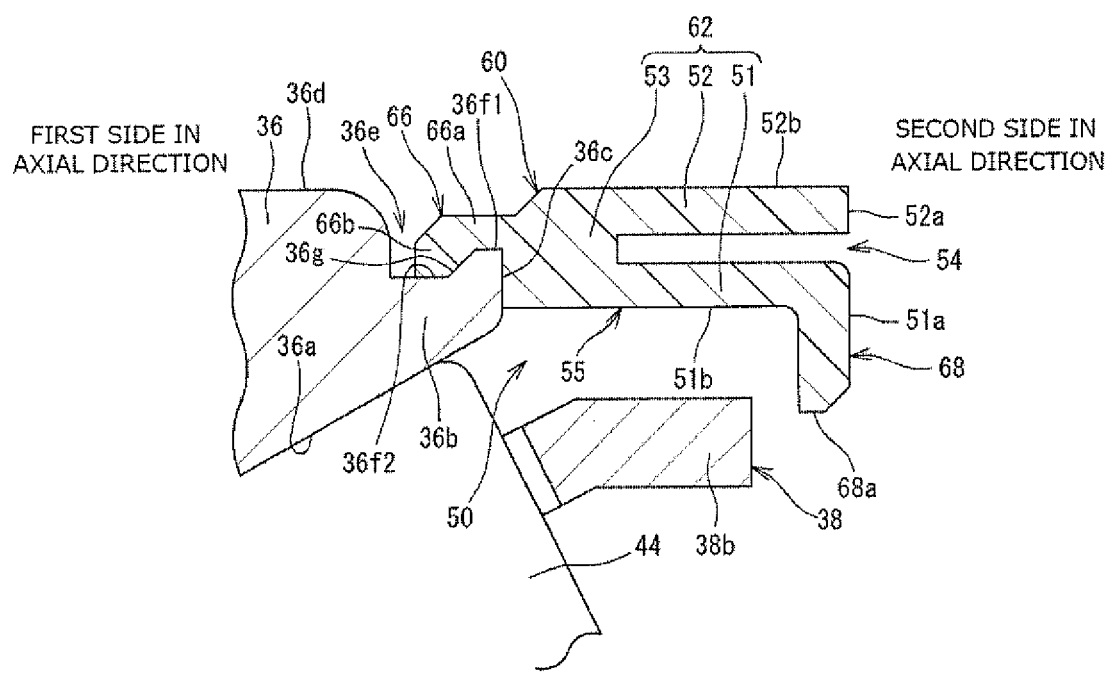
FIG. 3 is a sectional view illustrating a holding member and a periphery thereof.

FIG. 3 is a sectional view illustrating the holding member 60 and a periphery thereof. The cylindrical portion 62 is provided in contact with a large-diameter-side end surface 36c of the outer ring 36. An annular groove (recessed groove 55) with a recessed section is formed between an inner peripheral surface (51b) of the cylindrical portion 62 and the annular protruding portion 68 and a second-side end 36b of the outer ring 36 in the axial direction.

The holding member 60 is made of a synthetic resin that is excellent in oil resistance and heat resistance (for example, a polyamide-based resin or a polyphenylene sulfide resin). In the holding member 60, the cylindrical portion 62 and the protruding portion 68 are integrally formed. The holding member 60 in the present embodiment has fitting portions that are fitted into a part (end 36b) of the outer ring 36 so that the holding member 60 is integrated with the outer ring 36. The fitting portions in the present embodiment are fitting pawls 66. The fitting pawls 66 are also integrated with the cylindrical portion 62 and the protruding portion 68. The components of the holding member 60 will further be described.

The cylindrical portion 62 generally has a cylindrical shape having a peripheral wall parallel to a centerline C (see FIG. 2) of the front bearing 30. In the cylindrical portion 62, a slit 54 is formed which is open toward the second side of the cylindrical portion 62 in the axial direction. The slit 54 separates the cylindrical portion 62 into a radially inner portion 51 provided with the protruding portion 68 and a radially outer portion 52 in the radial direction. In other words, the cylindrical portion 62 has the radially inner portion 51, the radially outer portion 52, and a base portion 53. The radially outer portion 52 is positioned outside the slit 54 in the radial direction such that the slit 54 lies between the radially outer portion 52 and the radially inner portion 51. The base portion 53 connects the radially inner portion 51 and the radially outer portion 52 together. The slit 54 is formed over the entire circumference of the cylindrical portion 62. Thus, the radially inner portion 51 and the radially outer portion 52 are each a cylinder-shaped portion having a peripheral wall parallel to the centerline C (see FIG. 2) of the front bearing 30. The base portion 53 is a ring-like portion.

The cylindrical portion 62 has an axial length spanning from the large-diameter-side end surface 36c of the outer ring 36 beyond the second-side end (large-diameter-side annular portion 38b) of the cage 38. The radially inner portion 51 and the radially outer portion 52 have the same dimension from the base portion 53 in the axial direction. The position of an axially-second-side end surface 51a of the radially inner portion 51 coincides with the position of an axially-second-side end surface 52a of the radially outer portion 52 with respect to the axial direction. An outer peripheral surface 52b of the radially outer portion 52 is formed to have substantially the same diameter (or the same diameter) as that of an outer peripheral surface 36d of the outer ring 36. An inner peripheral surface 51b of the radially inner portion 51 is formed to have a larger diameter than an inner peripheral surface of the second-side end 36b of the outer ring 36 in the axial direction. The inner peripheral surface 51b corresponds to a bottom surface of the reservoir portion 50 for the lubricant L.

As will be described later, the holding member 60 and the outer ring 36 are installed in the housing 12 (see FIG. 1) by press fitting as the end surfaces 51a and 52a of the cylindrical portion 62 are pressed in the axial direction with the holding member 60 and the outer ring 36 integrated together by the fitting pawls 66. Thus, the holding member 60, particularly the cylindrical portion 62, is configured to have a strength sufficient to withstand a pressing force acting when the cylindrical portion 62 is pressed in the axial direction. In other words, the end surfaces 51a and 52a of the cylindrical portion 62 serve as pressed surfaces. The force that presses the pressed surfaces (end surfaces 51a and 52a) is transmitted to the radially inner portion 51 and the radially outer portion 52 as an axial compressive force. The base portion 53 is configured to come, upon receiving the axial compressive force, into surface contact with the large-diameter-side end surface 36c of the outer ring 36 to transmit the force to the large-diameter-side end surface 36c. Thus, the pressing force does not act directly on the fitting pawls 66 or the protruding portion 68. The pressing force is transmitted to the radially inner portion 51 and the radially outer portion 52, which are cylindrical, and to the base portion 53, shaped like a ring, as an axial compressive force.

Consequently, the fitting pawls 66 and the protruding portion 68 are prevented from being damaged.

The protruding portion 68 is a portion annularly formed along the inner peripheral surface 51b of the radially inner portion 51 of the cylindrical portion 62. The protruding portion 68 is formed to be thinner than the whole cylindrical portion 62 so as to be elastically deformable. The protruding portion 68 depicted in FIG. 3 protrudes inward in the radial direction from a tip of the inner peripheral surface 51b of the radially inner portion 51. A protruding direction of the protruding portion 68 is orthogonal to the inner peripheral surface 51b. A bore diameter of the protruding portion 68 at a tip 68a is smaller than an outside diameter of the large-diameter-side annular portion 38b of the cage 38. The protruding portion 68 covers (a part of) the large-diameter-side annular portion 38b in the axial direction. Consequently, as depicted in FIG. 2, the protruding portion 68 receives the lubricant L flowing through the front bearing 30 along the outer-ring raceway surface 36a. In a lower portion of the front bearing 30, the protruding portion 68 enables the lubricant L to be held in an area (reservoir portion 50) outside the large-diameter-side annular portion 38b in the radial direction. The holding member 60 is positioned outside the large rib 32c of the inner ring 32 in the radial direction. In an upper portion of the front bearing 30, the protruding portion 68 also allows the stored lubricant L to be guided toward the large rib 32c of the inner ring 32.

Figure 4:
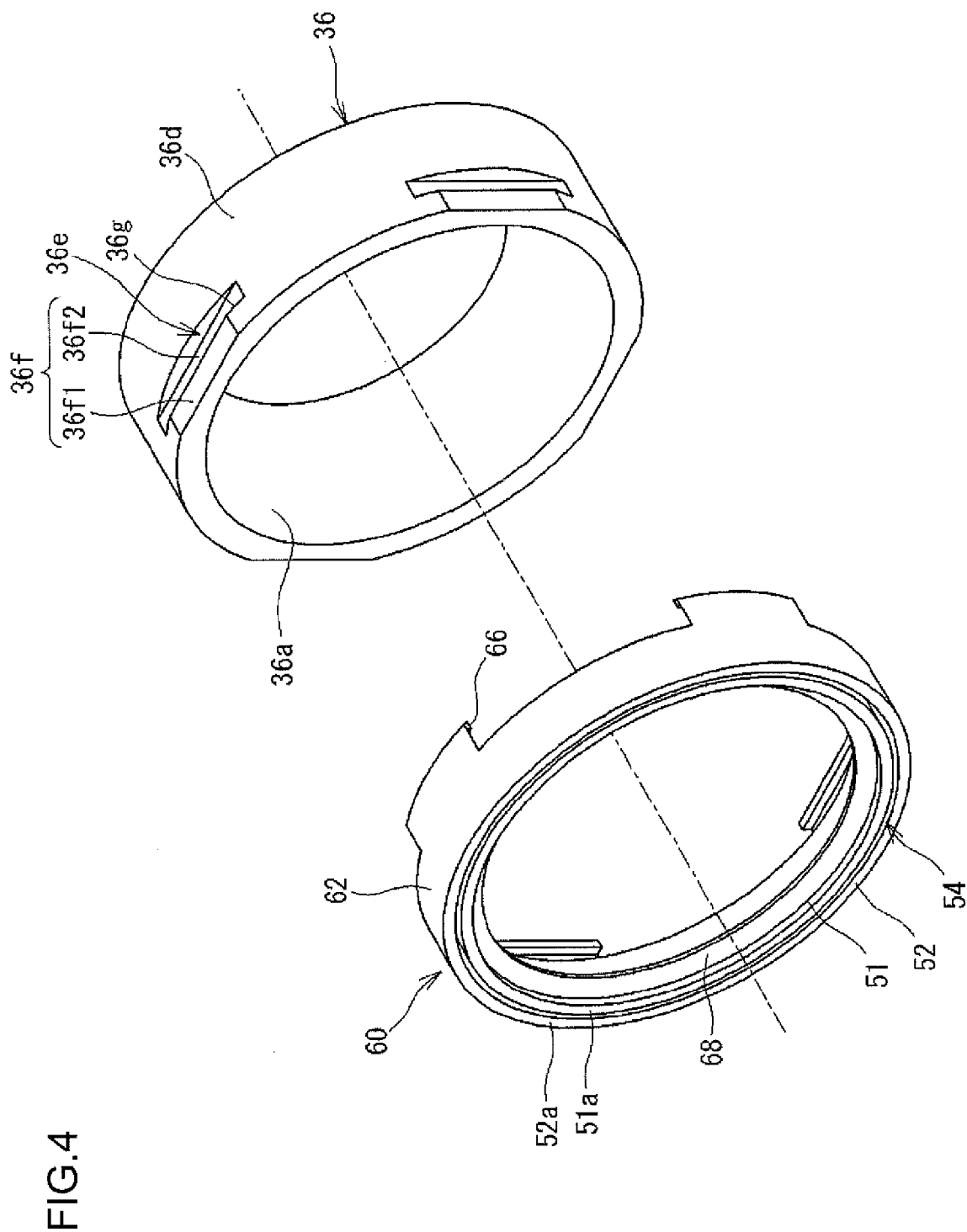
FIG. 4 is an exploded perspective view of an outer ring and the holding member.

In FIG. 3, the fitting pawls 66 are fitted into groove portions 36e formed in the outer peripheral surface 36d of the outer ring 36. FIG. 4 is an exploded perspective view of the outer ring 36 and the holding member 60. The groove portions 36e are formed in the outer peripheral surface 36d of the outer ring 36 at four positions so as to be spaced from one another in the circumferential direction. Four fitting pawls 66 are correspondingly provided so as to be spaced from one another in the circumferential direction. The number of the fitting pawls 66 (groove portions 36e) is changeable as long as three or more fitting pawls 66 are provided. The fitting pawls 66 (groove portions 36e) are arranged at regular intervals in the circumferential direction.

The groove portions 36e in the outer ring 36 will be described. Each of the groove portions 36e has a cutout portion 36f formed by cutting out a part of the outer peripheral surface 36d of the outer ring 36. The cutout portion 36f has two cutout surfaces 36f1 and 36f2 with different depths. A step surface 36g is formed between the cutout surfaces 36f1 and 36f2. The step surface 36g is engaged with the corresponding fitting pawl 66 of the holding member 60. In FIG. 3, each of the fitting pawls 66 extends from one end of the cylindrical portion 62 (the base portion 53) in the axial direction. Each of the fitting pawls 66 has a coupling portion 66a and a pawl portion 66b. The coupling portion 66a extends from the cylindrical portion 62 (base portion 53) in the axial direction. The pawl portion 66b protrudes inward from a tip of the coupling portion 66a in the radial direction. In each of the fitting pawls 66, the coupling portion 66a extends over the cutout surface 36f1 and the pawl portion 66b is caught on the step surface 36g. Thus, the holding member 60 and the outer ring 36 are integrated together.

The holding member 60 configured as described above is provided on the second side of the outer ring 36 in the axial direction to enable the lubricant L inside the bearing to be held. The slit 54 is formed in the cylindrical portion 62 of the holding member 60 to separate the radially inner portion 51 provided with the protruding portion 68 from the radially outer portion 52 in the radial direction. Thus, the protruding portion 68 is elastically deformable. The slit 54 further allows the radially inner portion 51 provided with the protruding portion 68 to be easily elastically deformed outward in the radial direction.

In FIG. 1, the rear bearing 40 (tapered roller bearing) provided closer to the drive pinion 16 is configured similarly to the front bearing 30. The rear bearing 40 will be described in brief with reference to FIG. 6. The rear bearing 40 has an outer ring 46, an inner ring 42, tapered rollers 44, a cage 48, and a holding member 80. The rear bearing 40 is a tapered roller bearing that is larger (in bearing number) than the front bearing 30.

Like the holding member 60, located forward, the holding member 80 of the rear bearing 40 has a cylindrical portion 82, an annular protruding portion 88, and fitting pawls 86. The protruding portion 88 protrudes inward from the cylindrical portion 82 in the radial direction. The fitting pawls 86 are fitted into respective parts of the outer ring 46 so that the holding member 80 is integrated with the outer ring 46. Like the holding member 60, located forward, the holding member 80 can form a lubricant reservoir portion that enables the lubricant flowing through the rear bearing 40 to be held. As is the case with the holding member 60, located forward, a slit 154 is formed in the cylindrical portion 82 of the holding member 80 to separate a radially inner portion 151 provided with the protruding portion 88 from a radially outer portion 152.

Figure 5:
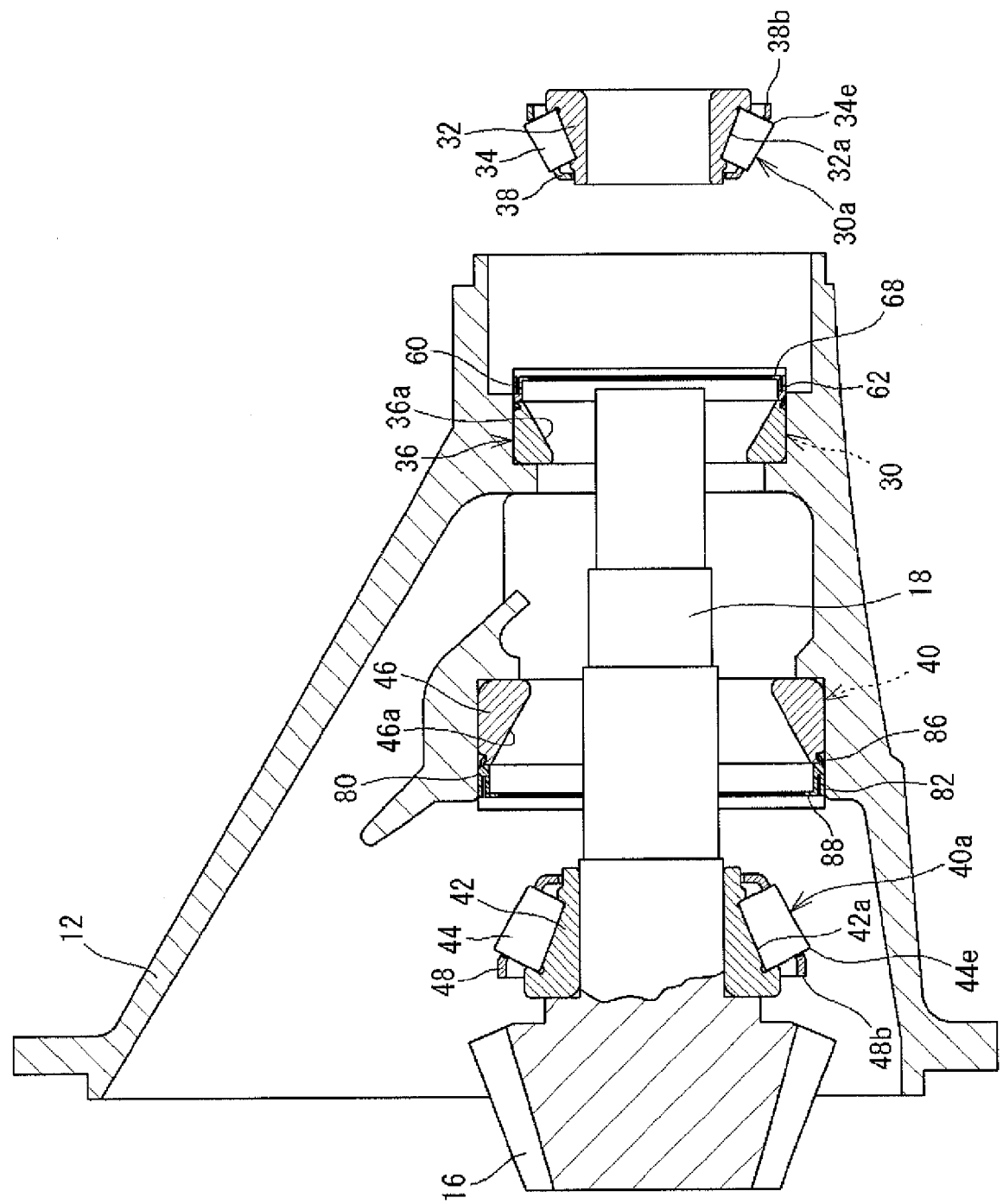
FIG. 5 is a longitudinal sectional view depicting a part of a differential apparatus being assembled.

A method will be described in which the front bearing 30 and the rear bearing 40 are assembled in the differential apparatus 10 depicted in FIG. 1. To construct the front bearing 30 depicted in FIG. 1, the holding member 60 and the outer ring 36 are placed in line and moved closer to each other along the axial direction to fit the fitting pawls 66 of the holding member 60 into the respective groove portions 36e of the outer ring 36 as depicted in FIG. 4. Thus, the outer ring 36 and the holding member 60 are integrated together. In this state, the pressed surfaces (end surfaces 51a and 52a) of the holding member 60 are pressed in the axial direction so that the outer ring 36 and the holding member 60 are press-fitted into the housing 12. FIG. 5 illustrates that the outer ring 36 and the holding member 60 have been completely press-fitted into the housing 12. FIG. 5 is a longitudinal sectional view depicting a part of the differential apparatus 10 being assembled.

Like the outer ring 36 and the holding member 60 for the front bearing 30 integrated together as depicted in FIG. 4, the outer ring 46 and the holding member 80 for the rear bearing 40 are integrated together. In this state, a part of the holding member 80 is pressed in the axial direction and press-fitted into the housing 12. FIG. 5 illustrates that the part of the holding member 80 has been completely press-fitted into the housing 12.

Figure 6:
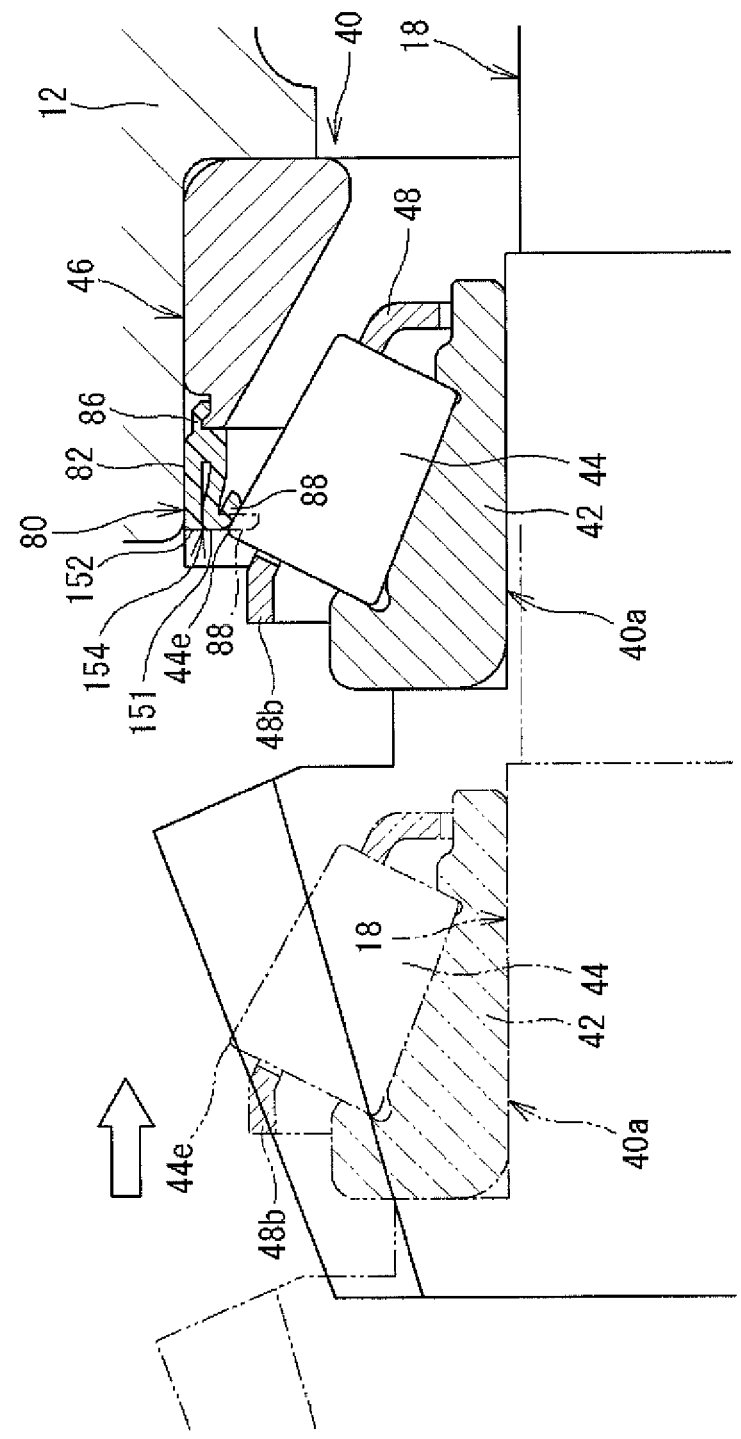
FIG. 6 is a longitudinal sectional view depicting a rear bearing and a periphery thereof.

The cage 48 with the tapered rollers 44 housed therein is positioned over the inner-ring raceway surface 42a of the inner ring 42 to form an inner ring unit 40a. The inner ring unit 40a is externally fitted over the shaft 18 (see FIG. 5). As depicted in FIG. 6, the inner ring unit 40a integrated with the shaft 18 is moved along the axial direction and closer to the holding member 80 and the outer ring 46 installed in the housing 12. Consequently, the tapered rollers 44 included in the inner ring unit 40a pass through the holding member 80. The shaft 18 and the inner ring unit 40a are moved along the axial direction to a position where the tapered rollers 44 come into contact with the outer-ring raceway surface 46a. At this time, radial outermost portions 44e of the tapered rollers 44 and an end (large-diameter-side annular portion 48b) of the cage 48 come into contact with the protruding portion 88 of the holding member 80, as depicted in FIG. 6. The protruding portion 88 is elastically deformed. Then, the radially inner portion 151 with the protruding portion 88 formed thereon is elastically deformed outward in the radial direction. Thus, the inner ring unit 40a can be assembled into the outer ring 46 with no damage caused in the protruding portion 88. The rear bearing 40 is thus constructed.

Then, to construct the front bearing 30, the cage 38 (see FIG. 5) with the tapered rollers 34 housed therein is positioned over the inner-ring raceway surface 32a of the inner ring 32 to form an inner ring unit 30a. The inner ring unit 30a is moved along the axial direction and closer to the holding member 60 and the outer ring 36 installed in the housing 12, while being externally fitted over a shaft end of the shaft 18. Thus, the tapered rollers 34 included in the inner ring unit 30a pass through the holding member 60. The inner ring unit 30a is moved along the axial direction to a position where the tapered rollers 34 come into contact with the outer-ring raceway surface 36a. At this time, also in the front bearing 30, radial outermost portions 34e of the tapered rollers 34 and the end (large-diameter-side annular portion 38b) of the cage 38 come into contact with the protruding portion 68 of the holding member 80, as described above for the rear bearing 40 using FIG. 6. However, the protruding portion 68 is elastically deformed, and the radially inner portion 51 (see FIG. 3) with the protruding portion 68 formed thereon is elastically deformed outward in the radial direction. Thus, the inner ring unit 30a can be assembled into the outer ring 36 with no damage caused in the protruding portion 68. The front bearing 30 is thus constructed.

Thus, in the present embodiment (the front bearing 30 represents the embodiment in the description; see FIG. 3), the slit 54 is formed in the cylindrical portion 62 of the holding member 60. The radially inner portion 51 provided with the protruding portion 68 is separated from the radially outer portion 52 in the radial direction. The slit 54 allows the radially inner portion 51, included in the cylindrical portion 62 and provided with the protruding portion 68, to be easily elastically deformed outward in the radial direction. As a result, as depicted in FIG. 5, when the inner ring unit 30a having the inner ring 32, the cage 38, and the tapered rollers 34 is moved closer to the holding member 60 and the outer ring 36 to assemble the tapered roller bearing (front bearing 30), even when the radial outermost portions 34e of the tapered rollers 34 come into contact with the protruding portion 68 of the holding member 60, the radially inner portion 51 of the cylindrical portion 62 (see FIG. 3) is elastically deformed outward in the radial direction. Consequently, the radial outermost portions 34e of the tapered rollers 34 can easily climb over the protruding portion 68 of the holding member 60, facilitating the assembly.

In the present embodiment, the holding member 60 depicted in FIG. 3 has the fitting pawls 66 that are fitted over the end 36b of the outer ring 36 so that the holding member 60 is integrated with the outer ring 36. Consequently, the outer ring 36 and the holding member 60 can be integrally handled. Thus, the outer ring 36 and the holding member 60 are prevented from becoming separated, when installed in the housing 12, for example. This improves workability.

In the holding member 60 depicted in FIG. 3, the position of the axially-second-side end surface 51a of the radially inner portion 51 coincides with the position of the axially-second-side end surface 52a of the radially outer portion 52 with respect to the axial direction. Thus, in order to install the holding member 60 integrated with the outer ring 36 in the housing 12, the holding member 60 can be pressed in the axial direction and press-fitted into the housing 12, as described above. At this time, both the radially inner portion 51 and the radially outer portion 52 of the holding member 60 can be pressed. This enables an increase in the area of parts of the end surfaces (51a and 52a) of the holding member 60 that are pressed. Consequently, surface pressure can be reduced to prevent the holding member 60 from being damaged during assembly.

In the differential apparatus 10 (see FIG. 1) configured as described above, the lubricant L is stored in a lubricant chamber 19 that corresponds to a lower portion of the housing 12 and in which the ring gear 14 is arranged. The lubricant L in the lubricant chamber 19 is stirred, scooped up, and splattered by the rotating ring gear 14. In particular, the lubricant L scooped upward can flow through an introduction channel 21 formed in the upper portion of the housing 12 and between the front bearing 30 and the rear bearing 40. The lubricant L flowing in this manner can enter each of the front bearing 30 and the rear bearing 40 and is then used for lubrication.

The lubricant L having flowed through the front bearing 30 is held by the holding member 60 and can stay in the front bearing 30 (the reservoir portion 50: see FIG. 2). The lubricant L having flowed through the rear bearing 40 is held by the holding member 80 and can stay in the rear bearing 40. In the differential apparatus 10, rotation may be stopped and resumed when a predetermined time has elapsed. Immediately after the resumption of rotation (at an initial stage of rotation), even the scraping of the lubricant L in the lubricant chamber 19 as described above fails to immediately feed the lubricant L to the front bearing 30 and the rear bearing 40. However, in the present embodiment, the holding members 60 and 80 allow the lubricant L staying in the front bearing 30 and the rear bearing 40 to be used in the initial stage of rotation. In particular, in the tapered roller bearing (see FIG. 2), the tapered rollers 34 come into sliding contact with the large rib 32c of the inner ring 32, and the lubricant staying in the bearings can be used to lubricate the sliding contact surfaces (sliding surfaces) of the tapered rollers 34 and the large rib 32c. As a result, in the initial stage of rotation, the contact surfaces of the tapered rollers 34 and the large rib 32c can be prevented from being in a poor lubrication state. This allows seizure resistance to be enhanced.

Figure 7:
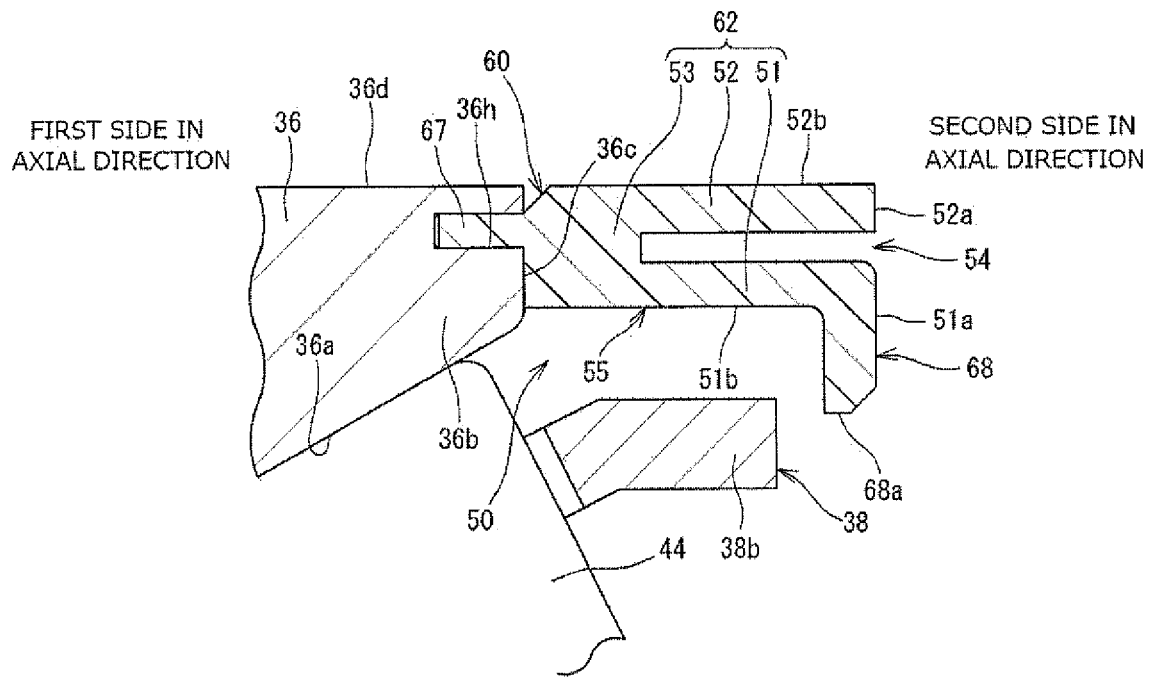
FIG. 7 is a sectional view illustrating a variation of the holding member.

FIG. 7 is a sectional view illustrating a variation of the holding member 60. The holding member 60 depicted in FIG. 7 differs from the holding member 60 depicted in FIG. 3 in the form of the fitting portions that are used so that the holding member 60 is integrated with the outer ring 36. The remaining parts of the configuration of the holding member 60 depicted in FIG. 7 are the same as the corresponding parts of the configuration of the holding member 60 depicted in FIG. 3 and will not be described below. The fitting portions depicted in FIG. 3 are the fitting pawls 66 that are fitted into the groove portions 36e formed in the outer peripheral surface 36d of the outer ring 36. However, the fitting portions depicted in FIG. 7 are protrusions 67 that are fitted into holes 36h formed in the large-diameter-side end surface 36c of the outer ring 36. The fitting portions of the holding member 60 may be in a form other than the forms depicted in FIG. 3 and FIG. 7.

Figure 8:
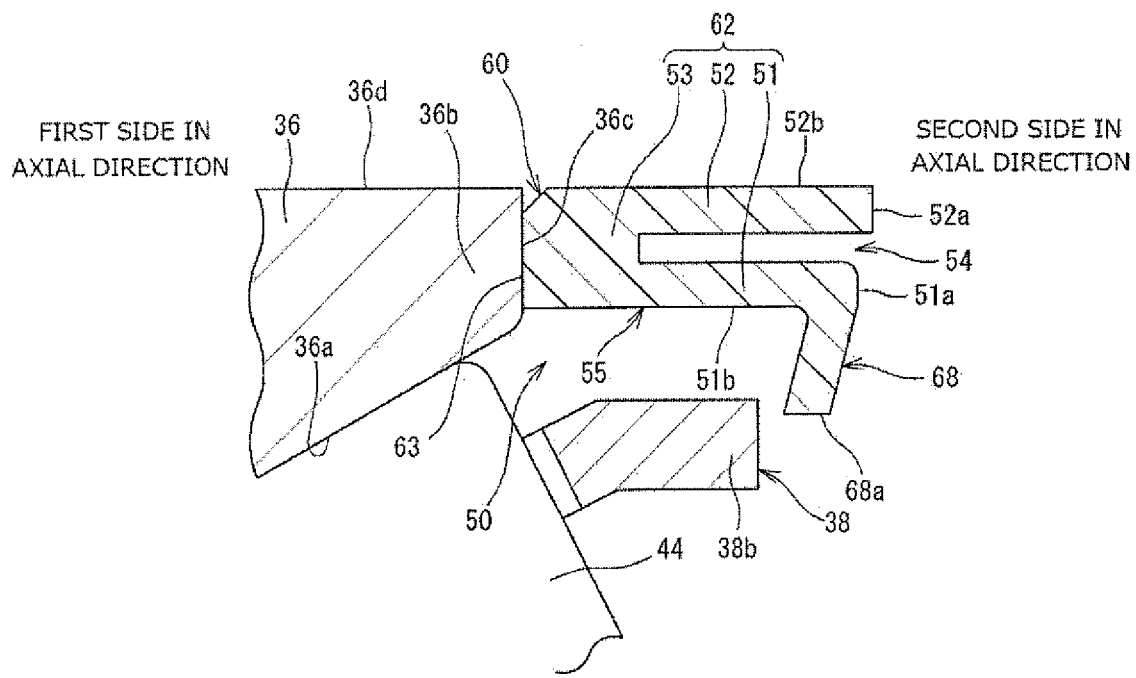
FIG. 8 is a sectional view illustrating a variation of the holding member.

FIG. 8 is a sectional view illustrating a variation of the holding member 60. The fitting portions may be omitted from the holding member 60 of the front bearing 30 (and the rear bearing 40). In this case, the outer ring 36 and the holding member 60 are installed in the housing 12 (see FIG. 1) while the large-diameter-side end surface 36c of the outer ring 36 and an annular end surface 63 of the cylindrical portion 62 of the holding member 60 are in abutting contact with each other. In this case, the outer ring 36 and the holding member 60 are separately installed in the housing 12.

The holding member 60 depicted in FIG. 8 differs from the holding member 60 depicted in FIG. 3 in an extending direction of the protruding portion 68. The protruding portion 68 depicted in FIG. 8 is inclined toward the tapered rollers 44 with respect to an imaginary plane orthogonal to the centerline C (see FIG. 2) of the front bearing 30. The protruding portion 68 may be in a form other than the illustrated forms. For example, a protruding height of the protruding portion 68 from the inner peripheral surface 51b of the radially inner portion 51 may be larger (than the protruding height in FIG. 8), and a bore diameter of the tip 68a of the protruding portion 68 may be smaller than a bore diameter of the large-diameter-side annular portion 38b of the cage 38. The position of the end surface 51a of the radially inner portion 51 depicted in FIG. 8 does not coincide with the position of the end surface 52a of the radially outer portion 52 with respect to the axial direction. This configuration allows the shape of the protruding portion 68 to be freely set. For example, the protruding portion 68 may be shaped to allow the lubricant flowing along the protruding portion 68 to be easily guided to between (the sliding surfaces of) the large rib 32c of the inner ring 32 and the tapered rollers 44. The slit 54 formed in the cylindrical portion 62 in each of the above-described forms is provided at a central position of the cylindrical portion 62 in a thickness direction (radial direction) thereof. The radially inner portion 51 and the radially outer portion 52 have the same thickness dimension. However, although not depicted in the drawings, the slit 54 in the cylindrical portion 62 may be located more inward or outward in the radial direction than the central position of the cylindrical portion 62 in the thickness direction (radial direction) thereof. If the slit 54 is formed more inward in the radial direction than the central position of the cylindrical portion 62, the radially inner portion 51 has a reduced thickness dimension (becomes thinner), resulting in a more easily elastically deformable configuration. Each of these configurations may be applied to the forms depicted in other figures.

Figure 9:
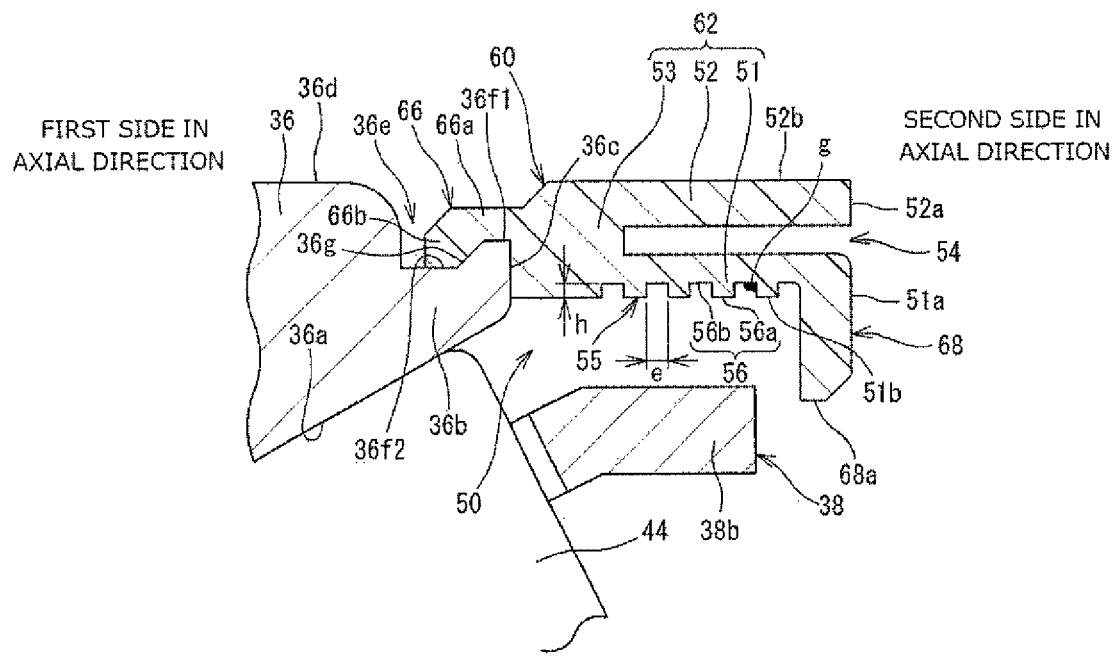
FIG. 9 is a sectional view illustrating a variation of the holding member.

FIG. 9 is a sectional view illustrating a variation of the holding member 60. The holding member 60 depicted in FIG. 9 differs from the holding member 60 depicted in FIG. 3 in the shape of a bottom portion of the recessed groove 55 formed on the inner periphery of the reservoir portion 50. The remaining parts of the configuration of the holding member 60 depicted in FIG. 9 are the same as the corresponding parts of the configuration of the holding member 60 depicted in FIG. 3 and will not be described below. The recessed groove 55 in the reservoir portion 50 has recesses and protrusions at a bottom portion of the recessed groove 55. In other words, the inner peripheral surface 51b of the radially inner portion 51 has recessed and protruding portions 56 forming recesses and protrusions. In the present embodiment, a plurality of the recessed portions 56b is formed and a plurality of protruding portions 56a is formed. However, the recessed and protruding portions 56 (recessed and protruding shape) may have any number of protruding portions 56a as long as the recessed and protruding portions 56 include at least one protruding portion 56a. In the present embodiment, the recesses and protrusions have a pulse wave-like shape, with the protruding portions 56a being rectangular.

The size of each of the recessed portions 56b included in the recessed and protruding portions 56 is set larger than the size of foreign matter g that may be contained in the lubricant L. Examples of the foreign matter g include grinding chips resulting from shaping of the housing 12 (see FIG. 1) and the like and wear debris from the gear 14 and the pinion 16 (see FIG. 1). For the grinding chips, the size of the foreign matter g is, for example, 100 μm to 200 μm. For the wear debris, the size of the foreign matter g is, for example, 5 μm to 15 μm. Thus, an axial dimension e of each of the recessed portions 56b is equal to or larger than the maximum value (200 μm) for the foreign matter g and is set 1.5 times as large as the maximum value (300 μm) or smaller. Likewise, a depth dimension (radial dimension) h of the recessed portions 56b is set to a value equal to or larger than the axial dimension e.

In the reservoir portion 50, the lubricant L can flow out from the recessed groove 55, whereas the foreign matter g having entered the recessed portion 56b is caught on the protruding portion 56a and prevented from flowing out from the recessed groove 55. The foreign matter g can be hindered from entering the inside of the bearing, for example, from reaching the raceway surfaces 32a and 36a or between the large rib 32c and the tapered rollers 34. If the foreign matter g enters the inside of the bearing along with the lubricant L, the life of the bearing may be shortened. However, with the front bearing 30 in the present embodiment, it is possible to prevent the life of the bearing from being shortened due to the foreign matter g.

The disclosed embodiments are illustrative in every respect and are not restrictive. In other words, the tapered roller bearing according to the invention is not limited to the illustrated forms but may be in any other form within the scope of the invention. In the above-described embodiments, the slit 54 formed in the holding member 60 is an annular cutout portion that extends continuously in the circumferential direction. However, the slit 54 may be a discontinuous cutout portion that does not extend continuously. In the above-described embodiments, the rotating apparatus including the tapered roller bearing according to the invention is a differential apparatus. However, the rotating apparatus may be a gear mechanism such as a transmission in an automobile.

In the tapered roller bearing according to the invention, when the inner ring unit having the inner ring, the cage, and the tapered rollers is moved closer to the holding member and the outer ring to assemble the tapered roller bearing, if the radial outermost portions of the tapered rollers come into contact with the protruding portion of the holding member, the radially inner portion of the cylindrical portion is elastically deformed. Consequently, the radial outermost portions of the tapered rollers can easily climb over the protruding portion of the holding member, facilitating assembly.

What is claimed is:

1. A tapered roller bearing comprising:
   an outer ring having an outer-ring raceway surface that increases in diameter from a first side toward a second side of the outer ring in an axial direction;
   an inner ring having an inner-ring raceway surface facing the outer-ring raceway surface and having a cone back face rib that is located on the second side of the inner ring in the axial direction and that protrudes outward in a radial direction;
   a plurality of tapered rollers interposed between the outer-ring raceway surface and the inner-ring raceway surface;
   an annular cage that holds the tapered rollers spaced at intervals in a circumferential direction; and
   a holding member provided on the second side of the outer ring in the axial direction to enable a lubricant inside the bearing to be held, wherein
   the holding member has a cylindrical portion provided adjacently to the outer ring and a protruding portion protruding inward from the cylindrical portion in the radial direction, and a slit is formed in the cylindrical portion to separate a radially inner portion, on which the protruding portion is provided, from a radially outer portion.

2. The tapered roller bearing according to claim 1, wherein the holding member has a fitting portion that is fitted into a part of the outer ring so that the holding member is integrated with the outer ring.

3. The tapered roller bearing according to claim 1, wherein a position of an axially-second-side end surface of the radially inner portion coincides with a position of an axially-second-side end surface of the radially outer portion with respect to the axial direction.

4. The tapered roller bearing according to claim 3, wherein the holding member has a fitting portion that is fitted into a part of the outer ring so that the holding member is integrated with the outer ring.

* * * * *